US009652725B2

(12) United States Patent
Muller et al.

(10) Patent No.: US 9,652,725 B2
(45) Date of Patent: May 16, 2017

(54) PLACEHOLDER MANAGEMENT IN AN ACTIVITY MANAGER IN A COLLABORATIVE COMPUTING ENVIRONMENT

(75) Inventors: Michael Muller, Medford, MA (US); Daniel M. Gruen, Newton, MA (US); Thomas P. Moran, Palo Alto, CA (US); John C. Tang, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 2777 days.

(21) Appl. No.: 11/040,068

(22) Filed: Jan. 21, 2005

(65) Prior Publication Data

US 2006/0167938 A1 Jul. 27, 2006

(51) Int. Cl.
*G06Q 10/00* (2012.01)
*G06Q 10/06* (2012.01)

(52) U.S. Cl.
CPC .................................. *G06Q 10/06* (2013.01)

(58) Field of Classification Search
CPC ....... G06Q 10/06311; G06Q 10/06313; G06Q 10/101
USPC ............................ 705/7, 7.13, 7.23; 715/751
See application file for complete search history.

(56) References Cited

U.S. PATENT DOCUMENTS

| | | | |
|---|---|---|---|
| 5,774,661 A * | 6/1998 | Chatterjee et al. ........... 709/203 |
| 5,826,239 A * | 10/1998 | Du et al. ....................... 705/7.26 |
| 6,272,472 B1 * | 8/2001 | Danneels et al. ................ 705/27 |
| 2002/0120459 A1 * | 8/2002 | Dick et al. .......................... 705/1 |
| 2003/0233372 A1 * | 12/2003 | Warner et al. ............. 707/104.1 |
| 2005/0192822 A1 * | 9/2005 | Hartenstein et al. ............. 705/1 |

OTHER PUBLICATIONS

"Enterprise frameworks for workflow management systems", I Gimenes, L Barroca—Software: Practice and Experience, 2002—Wiley Online Library.*
Report from the NSF workshop on workflow and process automation in information systems A Sheth, D Georgakopoulos, S Joosten . . .—Sigmod Record, 1996—dl.acm.org.*

* cited by examiner

*Primary Examiner* — Jonathan G Sterrett
(74) *Attorney, Agent, or Firm* — Steven M. Greenberg, Esq.; CRGO Law

(57) ABSTRACT

A method, system and apparatus for placeholder management in a unified activity manager in a collaborative computing environment. A method for managing placeholders in a unified activity manager in a collaborative environment can include the step of inserting a placeholder in an activity in lieu of a specified collaborator, resource, or event. The inserting step can include describing a type of resource without specifying an identity of an actual resource; and, inserting the described type in the placeholder. The inserting step also can include describing a type of event without specifying an identity of an actual event; and, inserting the described type in the placeholder. The inserting step also can include describing a type of collaborator without specifying an identity of an actual collaborator; and, inserting the described type in the placeholder.

5 Claims, 3 Drawing Sheets

PLACEHOLDER MANAGEMENT IN AN ACTIVITY MANAGER IN A COLLABORATIVE COMPUTING ENVIRONMENT

BACKGROUND OF THE INVENTION

Statement of the Technical Field

The present invention relates to the field of collaborative computing and more particularly to the creation and management of resources in an activity in a collaborative computing environment.

Description of the Related Art

Collaborative computing refers to the use by two or more end users of a computing application in order to achieve a common goal. Initially envisioned as a document sharing technology among members of a small workgroup in the corporate environment, collaborative computing has grown today to include a wide variety of technologies arranged strategically to facilitate collaboration among members of a workgroup. No longer merely restricted to document sharing, the modern collaborative environment can include document libraries, chat rooms, video conferencing, application sharing, and discussion forums to name only a few.

A collaborative computing application enjoys substantial advantages over a more conventional, individualized computing application. Specifically, at present it is rare that a goal of any importance is entrusted and reliant upon a single person. In fact, most goals and objectives can be achieved only through the participation of a multiplicity of individuals, each serving a specified role or roles in the process. Consequently, to provide computing tools designed for use only by one of the individuals in the process can be short sighted and can ignore important potential contributions lying among the other individuals involved in the process.

Personal information managers, project management systems and workflow management systems represent three such computing applications which attempt to manage a process leading to an objective, leveraging of the participation of many individuals in the process. Considering first the personal information manager (PIM), in a PIM, a single end user can establish a calendar of events and a to-do list of tasks which are to be performed by the end user. To the extent that a task is to be performed by another individual, the end user only can establish a task reminding the end user to monitor the completion of the task by the other individual. PIMs do permit the calendaring of events among different individuals, but the calendaring operation only can "invite" others to calendar the event within the personal information manager of other users.

Project management systems provide means for an individual or a group to define and track project stages with strictly-specified interdependencies. In a traditional project management system, the phases of a project can be defined from start to finish and a timeline can be generated for the project. Utilizing the timeline, it can be determined when particular phases of the project have been completed and when a subsequently scheduled phase of the project can begin. To the extent that the timing of one phase of the project changes, the remaining project phases can be adjusted to accommodate the changed timing. Similarly, if the project requires the use of limited resources, and the allocation of one such resource changes, the remaining project phases that depend on that resource can be adjusted to accommodate the reduction of that resource. A major strength of project management systems is their maintenance of these kinds of strict interdependencies. In addition, in many project management systems, particular people can be assigned to particular phases of the project.

In these ways, the execution of a project can be better managed by a project manager using the project management system's control over timing, resources, and people. Notably, in most project management systems, the interdependencies are specified by the project manager, and the other users are relegated to the subordinate tasks of confirming that components have been completed, or indicating changes in resources. Changes in interdependencies are typically executed only by the project manager.

Workflow management systems differ substantially from PIMs and project management systems. In a workflow management system, different computing processes can be linked together by an electronic specification. Moreover, in a workflow management system, it is not important whether all of the computing processes are managed by a single entity and different ones of the computing processes can be distributed about a network of diverse computing resources. In the latter circumstance, the specifying electronic document merely need reference the pertinent computing processes in a way in which the processes can be located in the value chain. Most importantly, a workflow specifies a structure of distributed processes, executed by a combination of electronic and human agents, with rigid contingencies that are enforced among these agents.

Learning management systems can be viewed as collaborative forms of the project manager. In a typical learning management system, a project species—namely a syllabus—can be defined to include one or more assignments. A class can be created from the syllabus, one or more instructors can be assigned to the class and one or more students can be enrolled in the class. Advantageously, additional collaborative tools can be provided to facilitate the execution of the course, including a chat room, document library and discussion forum, to name a few.

Notwithstanding the foregoing, individualized PIMs, project management systems, and workflow management systems, as well as collaborative learning management systems, do not account for the actual nature of a coordinated set of collaborative tasks conducted by people, such as an activity. An activity, unlike a typical project or workflow, refers to objects, actions, and persons in the real world, and provides a computerized representation of selected aspects of those objects, actions, and persons.

Creating an activity collaboratively so that the activity can support a collaborative objective effectively can be a time consuming, iterative process. Much of the activity creation process can require an a priori knowledge of the resources to be consumed in the course of completing the activity, and those collaborators tasked with the completion of different tasks in the activity. Yet, in many cases the creator of an activity knows generally that one or more resources will be required of a particular nature or type, without knowing the precise identity of those resources. Similarly, in many cases the creator of an activity knows generally that one or more collaborators will be associated with the activity without knowing the precise identity of the collaborators. Again similarly, in many cases the creator of an activity knows generally that one or more events will be associated with the activity without knowing the precise date and time of each event, and without knowing the precise nature of each event.

SUMMARY OF THE INVENTION

The present invention addresses the deficiencies of the art in respect to activity management and provides a novel and non-obvious method, system and apparatus for creating and managing an activity utilizing placeholders in a collaborative environment. In a preferred aspect of the present invention, a unified activity manager for use in a collaborative environment can include an activity list having a hierarchical listing of activities, each of the activities having at least one task. The activity manager further can include an activity view having a rendering of properties associated with a selected activity in the activity list. The activity manager yet further can include a persons and roles view having at least a listing of collaborators available for association with the selected activity in the activity list. Finally, the activity manager can include a placeholder management module.

In a preferred aspect of the invention, the placeholder management module can include placeholder management logic programmed to manage placement of placeholders in any of the activity list, activity view and persons and roles view in lieu of a specified collaborator, resource, or event. The placeholder management logic further can include additional programming to place visual indicia adjacent to a placeholder in any of the activity list, the activity view and the persons and roles view. Finally, the placeholder management logic yet further can include additional programming to limit actions taken on individual ones of the placeholders.

A method for managing placeholders in an activity manager in a collaborative environment can include the step of inserting a placeholder in an activity in lieu of a specified collaborator, resource, or event. The inserting step can include describing a type of resource without specifying an identity of an actual resource; and, inserting the described type in the placeholder. The inserting step also can include describing a type of collaborator without specifying an identity of an actual collaborator; and, inserting the described type in the placeholder. The inserting step can also include describing a type of event without specifying the precise values of the date and time of the event or other of its parameters or contents.

In any of these cases, a visually distinct indicia can be rendered adjacent to the placeholder to distinguish the placeholder from an actual resource, collaborator, or event. Moreover, a visually distinct indicia can be rendered adjacent to an activity or task containing the placeholder to distinguish the activity from an activity or task not containing any placeholders. Finally, actions can be limited which are to be taken upon the placeholder.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for placeholder management in an activity in a collaborative environment. In accordance with the present invention, an activity can be created in a unified activity manager through the specification of a hierarchy of dependent activities, each of which may be further specified in a hierarchy of tasks. Different activities can be associated with one or more collaborators, resources, and events utilized in the completion of the activity. Yet, where the precise identity of a resource, collaborator, or event is not known when specifying the activity, a placeholder can be added to the activity in lieu of a specific resource or collaborator. Moreover, visual indicia can be incorporated in the hierarchy in association with the placeholder to indicate the presence of the placeholder.

Figure 1:
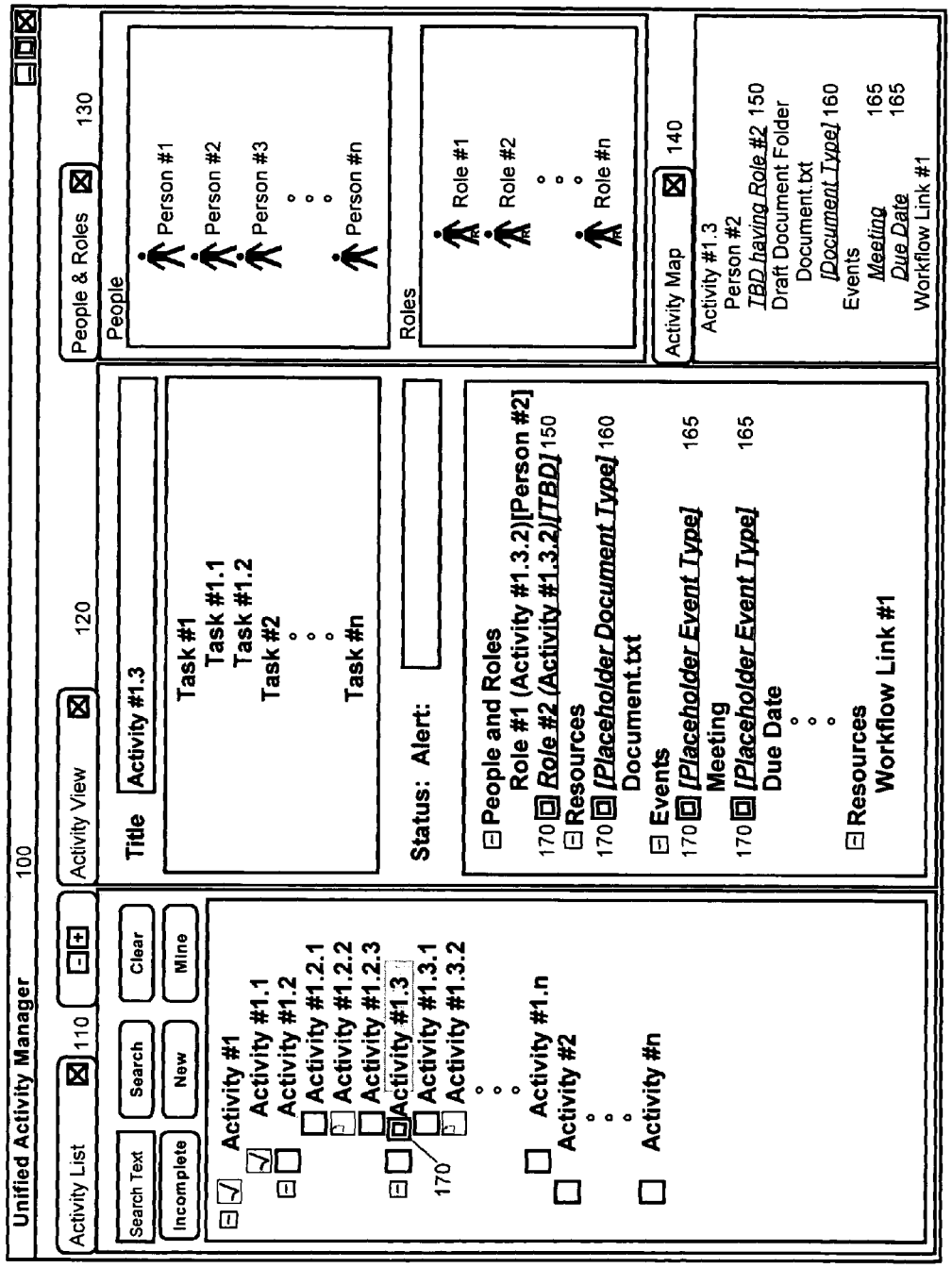
FIG. 1 is a pictorial illustration of a unified activity manager which has been configured in accordance with the present invention.

In further illustration, FIG. 1 is a pictorial illustration of a unified activity manager which has been configured in accordance with the present invention. The unified activity manager 100 can include several views including an activity list view 110, an activity view 120 and a people and roles view 130. The activity list view 110 can include a listing of one or more activities. Each activity can be decomposed into zero or more dependent activities, which together comprise a richer description of the work summarized in the original activity. Each of these dependent activities is itself an activity, but appears in a subactivity-relationship to the original activity. This process of defining activities in subactivity-relationship may be extended to any desired level of dependent description.

The activity view 120 can include a description of a task that is contained within the activity. The task description can include one or more tasks associated with the activity. Additionally, tasks can be decomposed into zero or more dependent tasks, which together comprise a richer procedural specification of the original task. Each of these dependent tasks is itself a task, but appears in a subtask-relationship to the original task. This process of specifying tasks in subtask-relationship may be extended to any desired level of dependent specification.

The activity view 120 further can include a detailed listing of the properties of a selected activity in the activity list view 110. Specifically, the detailed listing can include a listing of collaborators (people) specified for the activity. Further, the detailed listing can include a listing of events specified for the activity. Finally, the detailed listing can include a listing of links to internal workflows, external workflows or both.

Finally, the peoples and roles view 130 can include a listing of collaborators in the collaborative environment available for assignment to a specified activity in the activity list view 110. The peoples and roles view 130 also can include a listing of collaborative roles in the collaborative environment available for assignment to a specified activity in the activity list view 110. In this regard, a role can be compared to a person in that a person references a specific identity and a role references only a class of persons. Thus, a role is a placeholder for a person.

Finally, an activity map 140 can be provided. The activity map 140 can include a hierarchically arranged set of electronic mail messages, calendar entries, documents, files and file folders, and applications, such as an application share, discussion thread or chat session, to name a few.

Importantly, within each of the activity list view 110, activity view 120 and activity map 140 can incorporate placeholders 150, 160, 165 in lieu of an actually specified collaborator, resource, or event. In this regard, a collaborator placeholder 150, called a role, can specify the inclusion of a particular type of collaborator without additionally identifying a particular collaborator. Similarly, a resource placeholder 160, called an envelope, can specify the inclusion of a particular type of resource without additionally identifying a particular resource. Further, an event placeholder 165, called an occurrence, can specify the inclusion of a particular event without additionally identifying a particular event. In this way, when the identity of the particular collaborator, resource, or event becomes known, the placeholders 150, 160, 165 can be replaced with the specific identities.

Notably, the utilization of a placeholder can render an activity incomplete in its specification. In consequence, the textual content of the placeholders 150, 160, 165 can be rendered in a manner which is visually distinct from specified collaborators, resources, and events in the unified activity manager 100. Moreover, a visual indicia 170, such as an icon can be provided in association with the placeholders 150, 160, 165 to further call out the presence of a placeholder. Finally, the visual indicia 170 further can be provided in association with a task having incorporated therein placeholders 150, 160, 165 to indicate the inclusion of placeholders 150, 160, 165 in the task.

Figure 2:
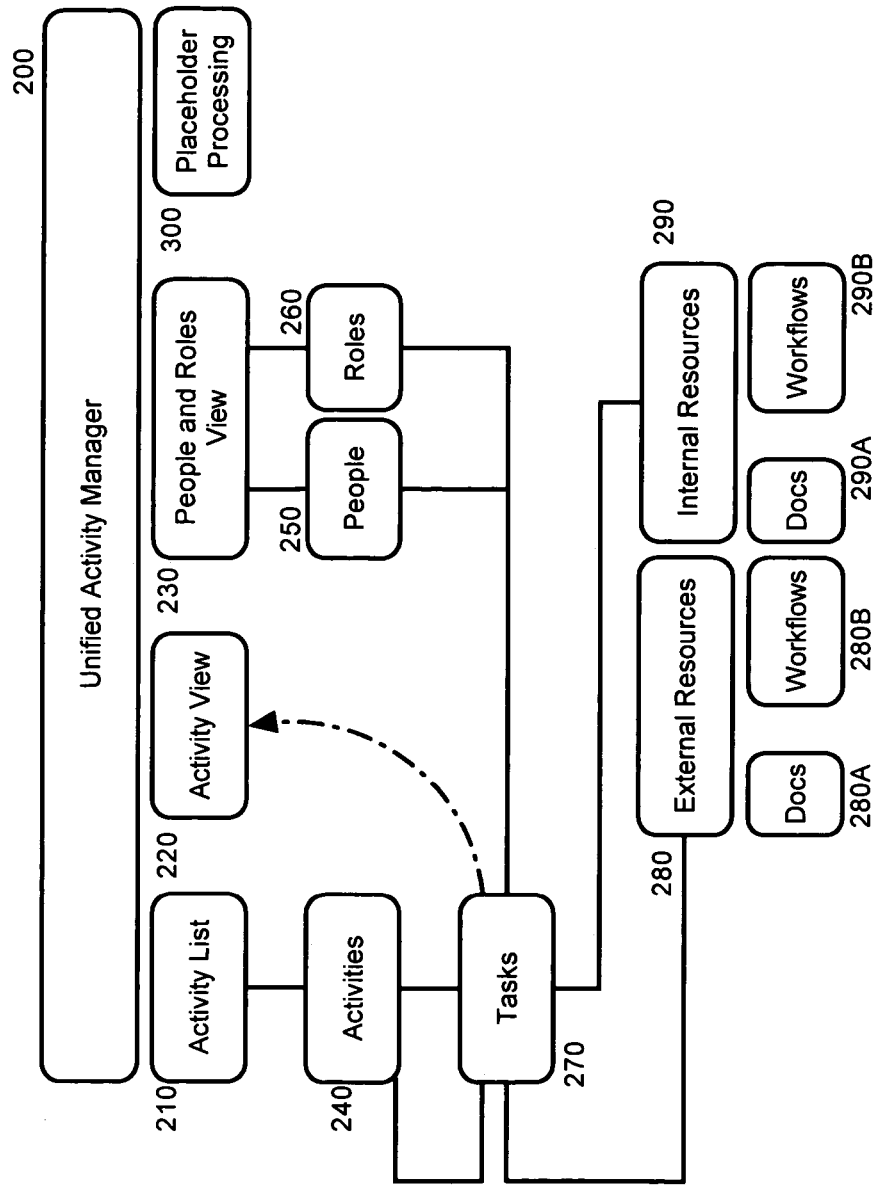
FIG. 2 is a block diagram illustrating an architecture for the unified activity manager of FIG. 1.

Turning now to FIG. 2, a block diagram is shown which illustrates the architecture for the activity manager of FIG. 1. The architecture can include the unified activity manager 200 which can have an activity list view 210, an activity view 220 and a people and roles view 230. The activity list view 210 can include one or more activities 240, each activity 240 having one or more tasks 270 or even other activities 240. The activity view 220 can include a visual rendering of the properties of a selected one of the activities 270. Finally, the people and roles view 230 can include one or more people 250 and one or more roles 260. Importantly, references to the people 250 and roles 260 can be included in the activities 270.

In accordance with the present invention, each of the activities 270 optionally can include links to both internal resources 280 and external resources 290. The internal resources 280 can include internally disposed documents 280A and internally specified workflows 280B to name only two. Similarly, the external resources 290 can include externally disposed documents 290A and externally specified workflows 290B. Other resources not shown can include references to internally available collaborative tools including application shares, chat sessions, document libraries, and e-mail messages, to name a few.

Utilizing the architecture of FIG. 2, activities can be created and managed so as to facilitate the collaborative achievement of a goal without requiring the use of a rigid, non-collaborative, conventional workflow or project management system. Rather, the activities can represent an informal and flexible structuring of to-dos and resources which can permit the collaborative execution of the activity in a conversational manner, regardless of the sequence of completion of the to-dos and irrespective of whether all to-dos in the activity are completed.

Importantly, the unified activity manager 200 yet further can include a placeholder management module 300. The placeholder management module 300 can be configured to control the placement and configuration of placeholders in tasks 270 within one of the activities 240. Also, the placeholder management module 300 can control the use of visual indicia not only in respect to a placeholder, but also in respect to the activities 240 and tasks 270 which may contain placeholders. Finally, the placeholder management module 300 can, if so specified by a collaborator, restrict the use of the activities 240 or the tasks 270 when those activities 240 and tasks 270 contain placeholders prior to the replacement of the placeholders with specified collaborators, resources, and events. Alternatively, if so specified by a collaborator, upon usage of a particular activity or task, the placeholder management module 300 can remind a user that at least one placeholder has not yet been replaced with an actual value for that particular activity or task.

Further, if a task or activity contains a placeholder, then it may be advantageous for all of the collaborators to know when that placeholder has been replaced with an actual identity. If specified by a collaborator, the placeholder management module 300 can notify all involved collaborators when a placeholder has been replaced with a person, resource, or event.

Finally, it may be advantageous for a collaborator who has been assigned to a role to receive information about that role and its responsibilities. A collaborator can provide a message, document, or other information in association with a role, such that the provided materials will be sent by the placeholder management module 300 to the person who replaces the role.

Figure 3A:
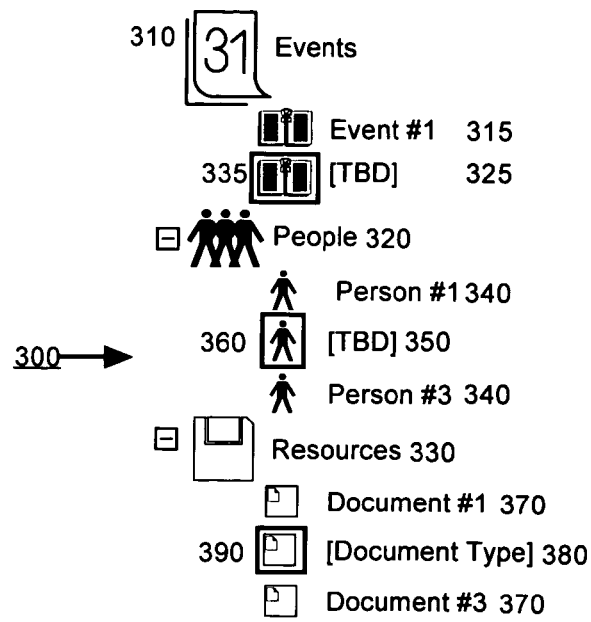
FIG. 3A is a pictorial illustration of a hierarchy of events, resources and collaborators having placeholders in the unified activity manager of FIG. 1; and, FIG. 3B is a flow chart illustrating a process for managing placeholders in the hierarchy of FIG. 3A.

To further illustration the operation of placeholders in the context of the architecture of FIG. 2, FIG. 3A is a pictorial illustration of a hierarchy 300 of events, resources and collaborators having placeholders. In the hierarchy 300 of FIG. 3A, a set of events 310, collaborators 320 and resources 330 are shown for use in one or more activities in the activity manager of FIG. 1. The events 310 can include not only specified events 315, but also a placeholder 325 for a yet to be specified event. Similarly, the collaborators 320 can include not only specified collaborators 340, but also a placeholder 350 for a yet to be specified collaborator. Again similarly, the resources 330 can include not only specified resources 370, but also a placeholder 380 for a yet to be specified resource. In all three cases, a visually distinct indicia can be provided to indicate the presence of a placeholder 360, 390, 335.

Figure 3B:
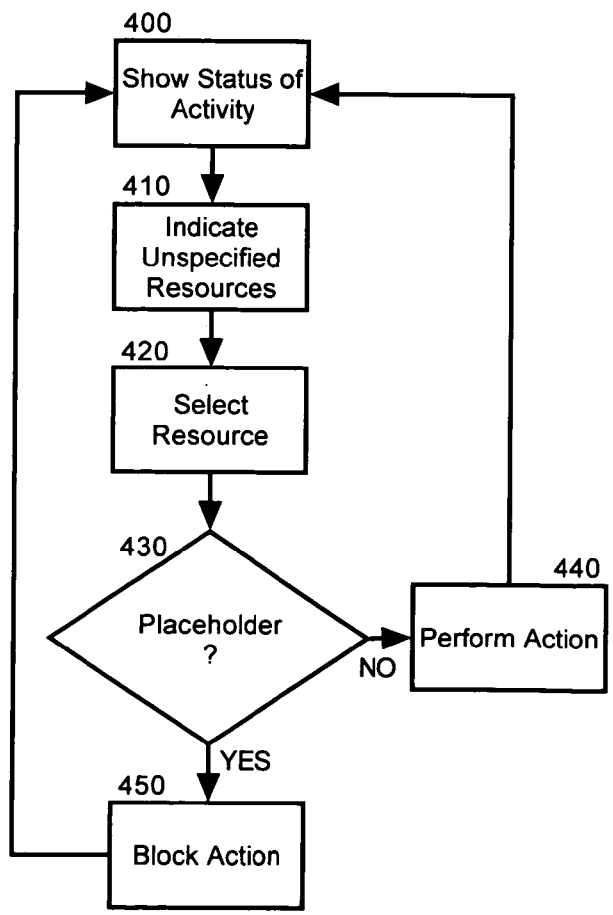

In a preferred aspect of the invention, actions relating to either the placeholder or the task or activity incorporating the placeholder can be blocked, limited or otherwise modified pending the substitution of the placeholder with a specified collaborator or resource. Specifically, FIG. 3B is a flow chart illustrating a process for managing placeholders in the hierarchy of FIG. 3A. In block 400, a view of a task or activity can be rendered and the status of the activity can be shown so as to indicate in block 410 the presence or absence of one or more placeholders in the task or activity.

In block 420, a particular resource, collaborator, or event can be selected as the subject of an action to be performed in the unified activity manager. In decision block 430, it can be determined whether the selected collaborator, resource, or event has been actually specified, or whether the selected collaborator, resource, or event is unspecified and held by a placeholder. If, in decision block 430 it is determined that the selected collaborator, resource, or event has been actually specified, in block 440, one or more actions can be performed on the selected collaborator, resource, or event. Otherwise, in block 450, one or more actions can be blocked, limited or otherwise modified, depending upon specification by a collaborator, until such time as the placeholder is replaced with a specified collaborator, resource, or event as the case may be.

While the preferred embodiment has described placeholders in terms of three attributes of an activity, namely collaborators, resources, and events, it will be obvious to one with ordinary skill that any other attribute of an activity can also be specified as either an identity or a placeholder, and will fall within the scope of this invention.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A unified activity manager for use in a collaborative environment comprising:

at least one computer system in which the unified activity manager executes;

an activity list view provided by the unified activity manager, the activity list view comprising a hierarchical listing of activities;

an activity view provided by the unified activity manager, the activity view comprising a rendering of properties associated with a selected activity in said activity list view;

a persons and roles view displayed concurrently in a single screen with the activity view and provided by the unified activity manager, the persons and roles view comprising at least a listing of collaborators available for association with said selected activity in said activity list view; and, a placeholder management module coupled to the unified activity manager, the module comprising program code enabled to display a placeholder for a collaborator designated to perform a task in an activity in the activity view in lieu of reference to a specific collaborator.

2. The unified activity manager of claim 1, wherein said activity view further comprises a listing of collaborators associated with said selected activity in said activity list view, a listing of roles associated with said selected activity in said activity list view, a listing of resources associated with said selected activity in said activity list view, and a listing of events associated with said selected activity in said activity list view.

3. The unified activity manager of claim 1, wherein said placeholder management module comprises placeholder management logic programmed to manage placement of placeholders in any of said activity list view, activity view and persons and roles view in lieu of a specified collaborator, resource, or event.

4. The unified activity manager of claim 3, wherein said placeholder management logic comprises additional programming to place visual indicia adjacent to a placeholder in any of said activity list view, said activity view and said persons and roles view.

5. The unified activity manager of claim 3, wherein said placeholder management logic comprises additional programming to limit actions taken on individual ones of said placeholders.

* * * * *